(12) United States Patent
Holsinger

(10) Patent No.: US 8,374,791 B2
(45) Date of Patent: Feb. 12, 2013

(54) METHOD OF OPERATING A NAVIGATION SYSTEM TO PROVIDE ROUTE GUIDANCE

(75) Inventor: David J. Holsinger, Chicago, IL (US)

(73) Assignee: Navteq B.V., Veldhoven (NL)

( * ) Notice: Subject to any disclaimer, the term of this patent is extended or adjusted under 35 U.S.C. 154(b) by 349 days.

(21) Appl. No.: 12/694,405

(22) Filed: Jan. 27, 2010

(65) Prior Publication Data

US 2011/0184639 A1      Jul. 28, 2011

(51) Int. Cl.
*G01C 21/00*      (2006.01)

(52) U.S. Cl. ........ 701/533; 701/409; 701/414; 701/420; 701/423; 701/426; 701/428; 701/431; 701/440; 701/450; 701/454; 701/461; 701/516; 701/523; 707/715; 707/749; 340/988

(58) Field of Classification Search ............ 701/1, 23, 701/24, 25, 26, 28, 29, 35, 201, 202, 205, 701/206, 207, 208, 290, 210, 211, 212, 213, 701/409, 414, 420, 423, 426, 428, 431, 440, 701/450, 454, 461, 516, 532, 533, 754; 340/988, 340/990, 999.1, 995.1, 995.2, 995.12, 995.18, 340/995.19, 995.22, 995.24; 707/749, 999.004, 707/E17.009, E17.018, 715; 1/1
See application file for complete search history.

(56) References Cited

U.S. PATENT DOCUMENTS

| | | | | |
|---|---|---|---|---|
| 5,751,228 A | 5/1998 | Kamiya et al. | | 340/998 |
| 5,835,854 A | 11/1998 | Palisson et al. | | 455/186.1 |
| 5,890,088 A | 3/1999 | Nimura et al. | | 701/211 |
| 6,012,028 A | 1/2000 | Kubota et al. | | 704/260 |
| 6,078,865 A | 6/2000 | Koyanagi | | 701/211 |
| 6,199,014 B1 | 3/2001 | Walker | | 701/211 |
| 6,212,474 B1 * | 4/2001 | Fowler et al. | | 701/440 |
| 6,339,746 B1 | 1/2002 | Sugiyama et al. | | 701/209 |
| 6,477,460 B2 | 11/2002 | Kepler | | 701/209 |
| 6,498,985 B1 | 12/2002 | Petzold | | 701/211 |
| 6,526,336 B2 * | 2/2003 | Strothmann | | 701/1 |
| 6,594,581 B2 | 7/2003 | Matsuda et al. | | 701/211 |
| 6,622,089 B2 | 9/2003 | Hasegawa et al. | | 701/211 |
| 6,728,635 B2 | 4/2004 | Hamada et al. | | 701/211 |
| 6,836,724 B2 * | 12/2004 | Becker et al. | | 701/516 |
| 7,149,626 B1 * | 12/2006 | Devries et al. | | 701/431 |
| 7,389,179 B2 | 6/2008 | Jin et al. | | 701/207 |

(Continued)

FOREIGN PATENT DOCUMENTS

| | | |
|---|---|---|
| EP | 0837434 | 4/1998 |
| EP | 1 508 889 | 2/2005 |

(Continued)

OTHER PUBLICATIONS

European Search Report, dated Dec. 6, 2010, European Appln. No. 10251162.3-1236.

(Continued)

*Primary Examiner* — McDieunel Marc

(57) ABSTRACT

A method of operating a navigation system to provide a route guidance message for traveling a route is performed by a navigation system. A preferred name of a feature visible from a road segment is obtained in a native language from a geographic database associated with the navigation system. The parts-of-speech of the preferred name are identified and converted into a target language text providing the preferred name in a target language. A guidance message includes the target language text in the target language.

20 Claims, 7 Drawing Sheets

U.S. PATENT DOCUMENTS

| | | | |
|---|---|---|---|
| 7,421,341 B1 * | 9/2008 | Hopkins et al. | 701/533 |
| 7,541,945 B2 | 6/2009 | Nakashima | 340/995.24 |
| 2001/0047393 A1 * | 11/2001 | Arner et al. | 709/216 |
| 2002/0009978 A1 | 1/2002 | Dukach et al. | 455/99 |
| 2002/0037104 A1 | 3/2002 | Myers et al. | |
| 2007/0078596 A1 | 4/2007 | Grace | 701/209 |
| 2007/0143345 A1 | 6/2007 | Jones et al. | 707/104.1 |
| 2007/0299607 A1 | 12/2007 | Cubillo | 701/211 |
| 2008/0262717 A1 | 10/2008 | Ettinger | 701/206 |
| 2008/0319659 A1 | 12/2008 | Horvitz et al. | 701/211 |
| 2009/0276318 A1 | 11/2009 | Broadbent et al. | 705/14.64 |
| 2009/0281728 A1 | 11/2009 | Mishra et al. | 701/210 |
| 2010/0223003 A1 | 9/2010 | Harada | 701/201 |
| 2011/0054772 A1 * | 3/2011 | Rossio et al. | 701/200 |
| 2011/0130956 A1 * | 6/2011 | Tracton et al. | 701/201 |

FOREIGN PATENT DOCUMENTS

| | | |
|---|---|---|
| EP | 2196975 | 6/2010 |
| JP | 2006275721 | 12/2006 |
| JP | 2009-186372 | 8/2009 |

OTHER PUBLICATIONS

European Search Report, dated Dec. 6, 2010, European Appln. No. 10006808.9-1236.

European Search Report, dated Jan. 18, 2011, European Appln. 10251267.0-1236.

Raubal, et al., "Enriching Wayfinding Instructions with Local Landmarks," Geographic Information Science, vol. 2478, pp. 243-259 (Jan. 1, 2002).

Extended European Search Report, dated Dec. 1, 2011, European Application No. 10193993.2.

* cited by examiner

METHOD OF OPERATING A NAVIGATION SYSTEM TO PROVIDE ROUTE GUIDANCE

BACKGROUND OF THE INVENTION

The present invention relates to a method and system for operating a navigation system, and more particularly to a method and system for providing route guidance using contextual elements along a calculated route from an origin location to a destination location.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to providing guidance to follow a route. Typically, route guidance identifies maneuvers to be taken at specified locations, such as turn left at next intersection. Some end users may get confused as to their orientation and where to turn. Accordingly, it would be beneficial to provide improved guidance to follow a route. More particularly, it would be beneficial to consider details in the end user's environment and context to provide a more natural, environmental and intuitive guidance message.

SUMMARY OF THE INVENTION

To address these and other objectives, the present invention comprises a method for operating a navigation system to provide a guidance message for traveling a route comprising at least one road segment. The method obtains data from a geographic database associated with the navigation system identifying a feature visible from the road segment and obtains preferred name data from the geographic database representing a preferred name of said feature visible from the road segment. The preferred name provides a visual description of the feature in a native language. The method identifies the parts-of-speech components of the preferred name and converts the parts-of-speech components of the preferred name into a target language text providing the preferred name in a target language. The target language is different from the native language. The method provides the guidance message including the target language text.

According to another aspect, the present invention comprises a navigation system. The navigation system comprises a processor, a geographic database associated with the processor, and a guidance application program executed on the processor to provide a guidance message for traveling a route comprising at least one road segment. The guidance application program obtains data from the geographic database identifying a feature visible from the route and a preferred name for the feature. The preferred name is in a native language. The guidance program identifies the parts-of-speech components of the preferred name, translates the parts-of-speech components of the preferred language into a target language and creates a target language text representing the preferred name in the target language.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
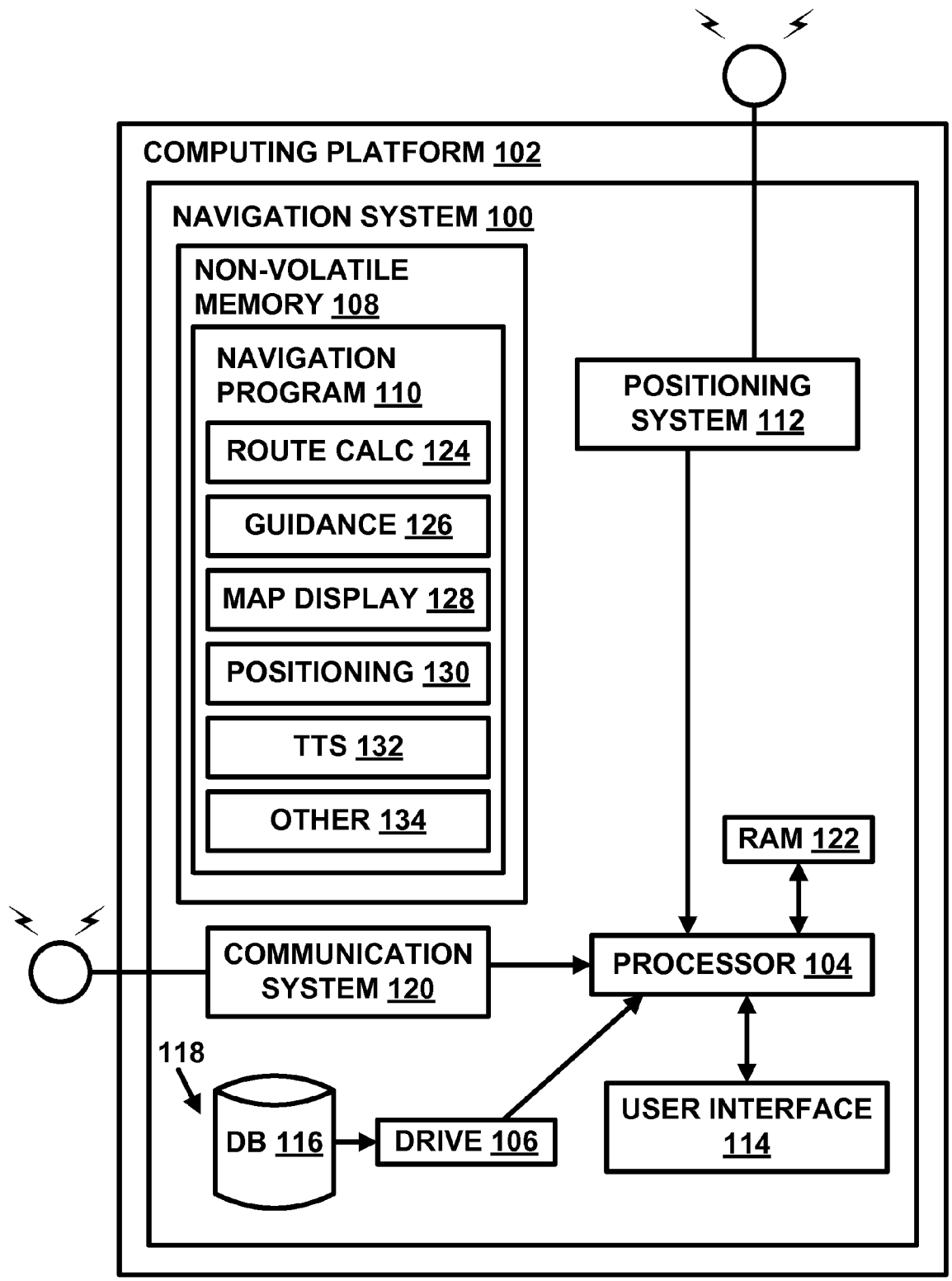
FIG. 1 is a block diagram of a navigation system, according to an exemplary embodiment.

FIG. 1 is a block diagram of a navigation system 100 associated with a computing platform 102, such as an in-vehicle navigation device, a personal navigation device, a mobile computer, mobile telephone, personal digital assistant (PDA), personal computer, or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The user interface 114 includes a microphone and speaker to allow speech input and output. The input information may include a request for navigation features and functions of the navigation system 100. To provide navigation features and functions, the navigation system 100 uses a geographic database 116 stored on a computer readable storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128 (wherein a map depicting the current position and route to travel are shown on a display), positioning 130 (e.g., map matching), and text-to-speech 132 (wherein guidance messages are converted from text into speech). Other functions and programming 134 may be included in the navigation system 100 including people and business finding services (e.g., electronic yellow and white pages), point of interest searching, destination selection, and location based advertising services.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

In alternative embodiments, the navigation system 100 includes local components, located physically with an end user, that communicate with remote components, located remotely from the end user. In this embodiment, the remote components include a navigation services server. The navigation application software programs 110 and the geographic database 116 reside with the navigation server. The local components of the navigation system communicate with the remote components via a communication link. The communication link may use any suitable technology and/or protocols that are currently available, as well as technology and/or protocols that become available in the future. A portion of the communications link may include a wireless portion that enables two-way communication between the local components and the remote components. The wireless portion may be implemented by any suitable form of wireless communication, including cellular, PCS, satellite, FM, radio, Bluetooth®, other long and short range transmission technologies or technologies that may be developed in the future.

II. Geographic Database

Figure 2:
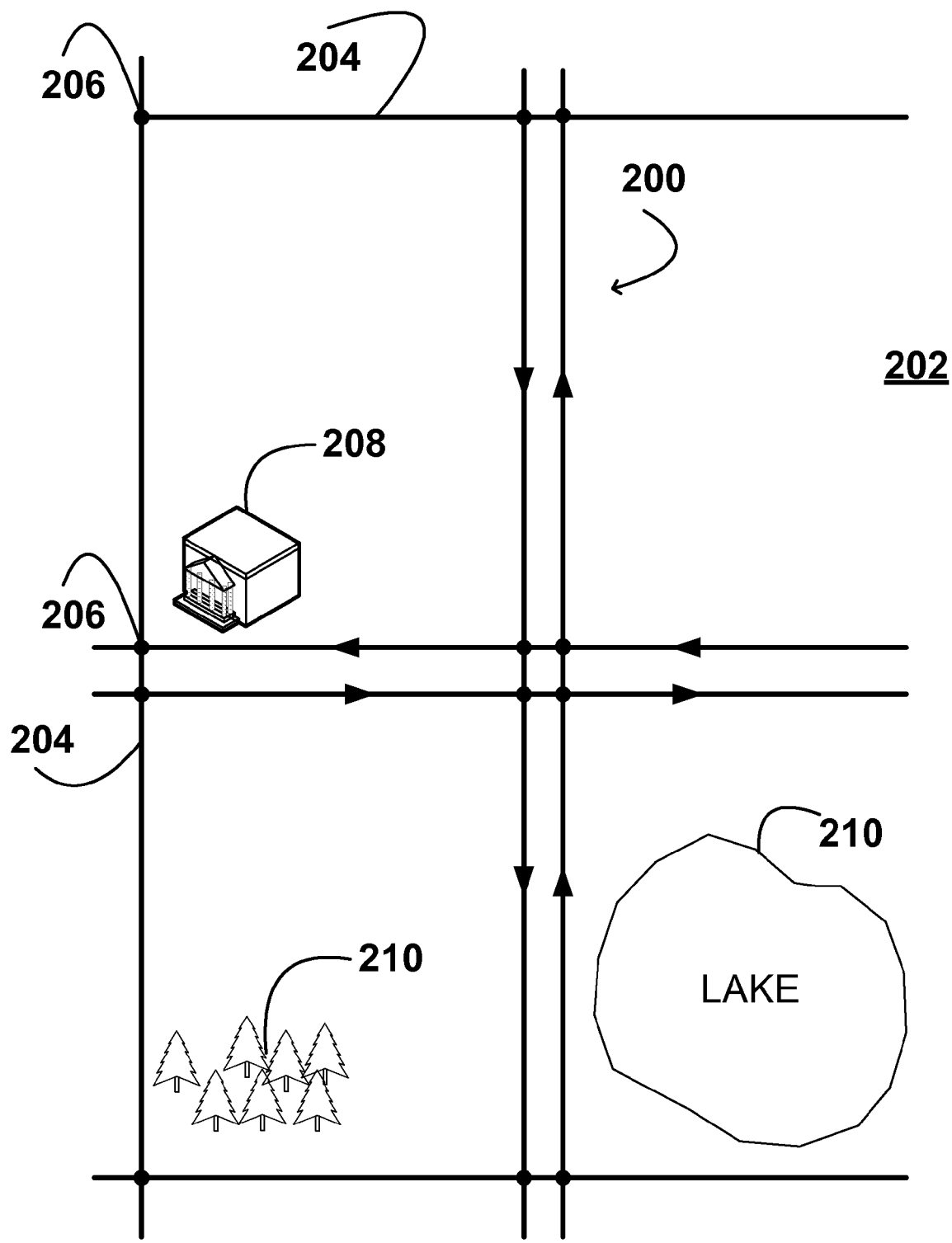
FIG. 2 shows a map of a geographic region.

In order to provide navigation-related features and functions to the end user, the navigation system 100 uses the geographic database 116. The geographic database 116 includes information about one or more geographic regions. FIG. 2 illustrates a map 200 of a portion of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

The map 200 illustrates part of a road network in the geographic region 202. The road network includes, among other things, roads and intersections located in the geographic region 202. Each road in the geographic region 202 is composed of one or more road segments 204. A road segment 204 represents a portion of the road. Each road segment 204 is shown to have associated with it two nodes 206; one node represents the point at one end of the road segment and the other node represents the point at the other end of the road segment. The node 206 at either end of a road segment 204 may correspond to a location at which the road meets another road, i.e., an intersection, or where the road dead-ends. The road segments 204 may include sidewalks and crosswalks for travel by pedestrians.

As shown in FIG. 2, the geographic region 202 further includes points of interest 208, such as businesses, facilities, restaurants, hotels, gas stations, stadiums, police stations, and so on. The geographic region 202 further includes other cartographic features 210, such as lakes, forests, rivers, hills, mountains and so on.

Figure 3:
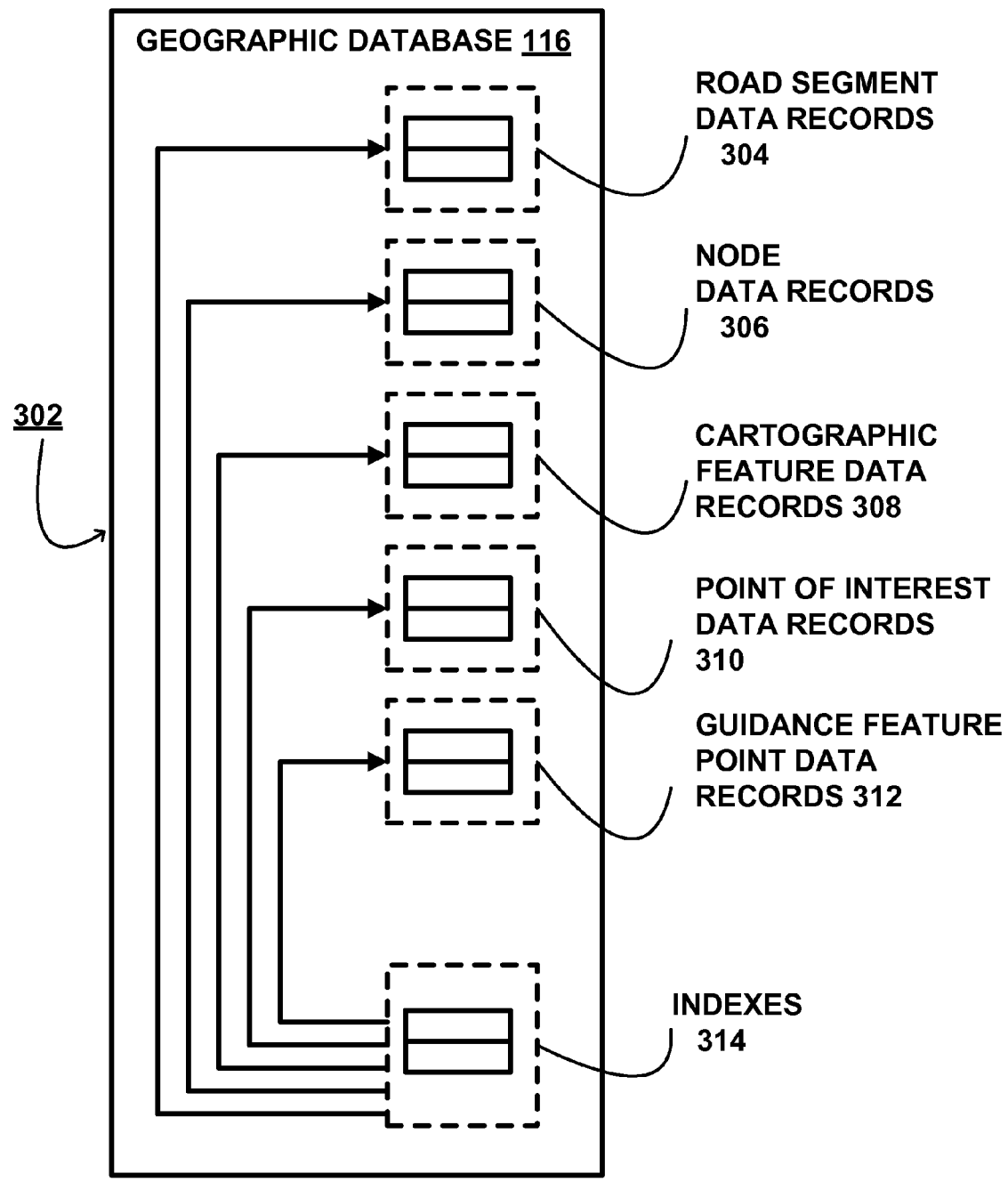
FIG. 3 is a block diagram of a geographic database that represents the geographic region included in the navigation system depicted in FIG. 1

Referring to FIG. 3, the geographic database 116 contains data 302 that represents some of the physical geographic features in the geographic region 202 depicted in FIG. 2. The data 302 contained in the geographic database 116 includes data that represent the road network for travel by vehicles and the pedestrian network for travel by pedestrians. In the embodiment of FIG. 3, the geographic database 116 that represents the geographic region 202 contains at least one road segment data record 304 (database record may also be referred to as "entity" or "entry") for each road segment 204 in the geographic region 202. The geographic database 116 that represents the geographic region 202 also includes a node data record 306 for each node 212 in the geographic region 202. The terms "nodes" and "segments" and "links" represent only one terminology for describing these physical geographic features, and other terminology for describing these features is intended to be encompassed within the scope of these concepts.

The geographic database 116 also contains cartographic feature data records 308 that represent cartographic features, such as lakes, rivers, railroads, airports, parks, forest and so on. The geographic database 116 further contains point of interest data records 310 that represent points of interest, such as businesses, facilities, restaurants, hotels, gas stations, stadiums, police stations, and so on. The point of interest data may include point of interest records comprising a type of point of interest, location of the point of interest, a phone number, hours of operation, etc.

Moreover, the geographic database 116 contains guidance feature point object data records 312 that indicate features visible from the road network (or pedestrian network) in the geographic area. The visible features are used to provide support for the end user to get route guidance instructions based on contextual elements surrounding the road segment (or pedestrian path). Such enhanced guidance is referred to as natural guidance, and natural guidance is defined as a turn-by-turn experience encompassing multiple attributes and relations which details the user's environment and context to more natural, environmental and intuitive triggers.

The geographic database 116 may also include other kinds of data. The other kinds of data may represent other kinds of geographic features or anything else. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the point of interest data records 310 with a road segment in the road segment data records 304.

Figure 4:
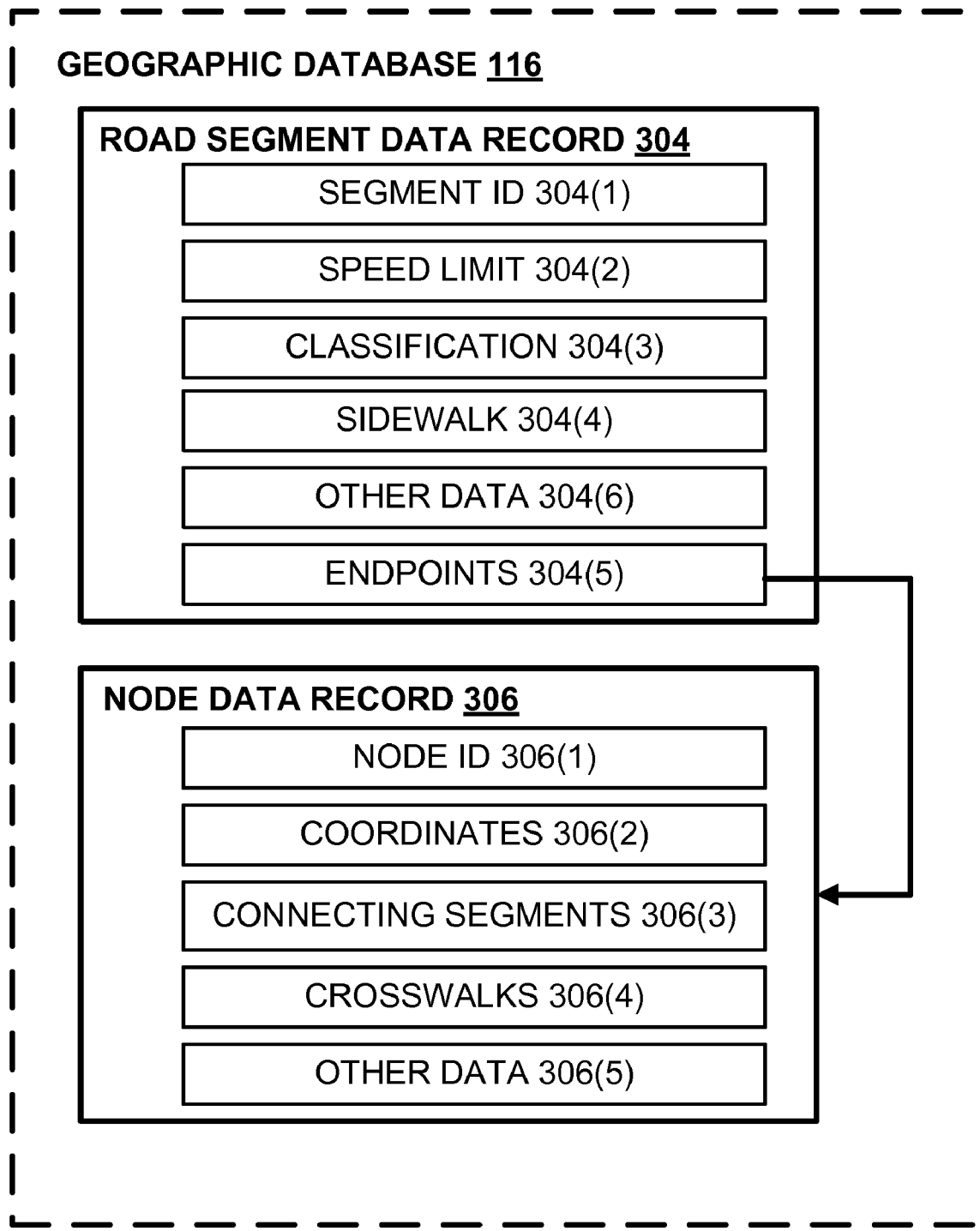
FIG. 4 is a block diagram of components of data records contained in the geographic database depicted in FIG. 3.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate a speed limit or speed category (i.e., the maximum permitted vehicular speed of travel) on the represented road segment. The road segment data record 304 may also include data 304(3) that indicate a classification such as a rank of a road segment that may correspond to its functional class.

The road segment data record also includes data 304(4) that indicate whether a sidewalk is associated with the road segment as well as attributes information for the sidewalk. The road segment data record 304 may also include or be associated with other data 304(6) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the end of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data record 304 also includes data 304(6) identifying the endpoints of the road segment and the location (e.g., the latitude and longitude) of the endpoints. In one embodiment, the endpoint data 304(6) references node data records 306 defined for the nodes corresponding to the endpoints of the represented road segment. By convention, each road segment is considered to have a "reference" or "left" endpoint and a "non-reference" or "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 306 includes a node ID 306(1) by which the record can be identified in the geographic database 116. The node data record 306 also includes data 306(2) data identifying the geographic coordinates (e.g., the latitude, longitude, and optionally altitude) of the represented node. The node data record 306 also includes data 306(3) identifying road segments that connect to the node to form an intersection. For example, a node identified by a node ID 306(1) may represent an intersection of two roads. At the intersection, each of the two roads may be represented by two road segments (located on opposite sides of the center of the intersection) each having an endpoint at the node. In this example of a standard four-way intersection, the connecting segment data 306(3) includes four segments IDs 304(1) identifying the four road segments that connect to the node to form the intersection.

The node data record 306 also include data 306(4) that indicate whether a crosswalk is present as well as attributes information for the crosswalk. The node data record 306 may also include other data 306(5) that refer to various other attributes of the nodes.

Figure 5A:
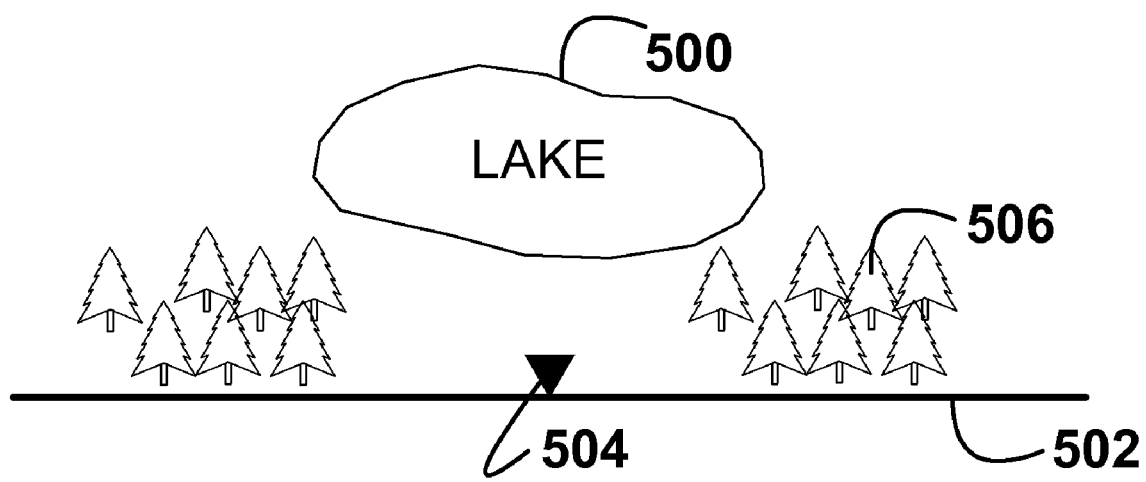
FIGS. 5a and 5b are representations of portions of the geographic region.
Figure 5B:
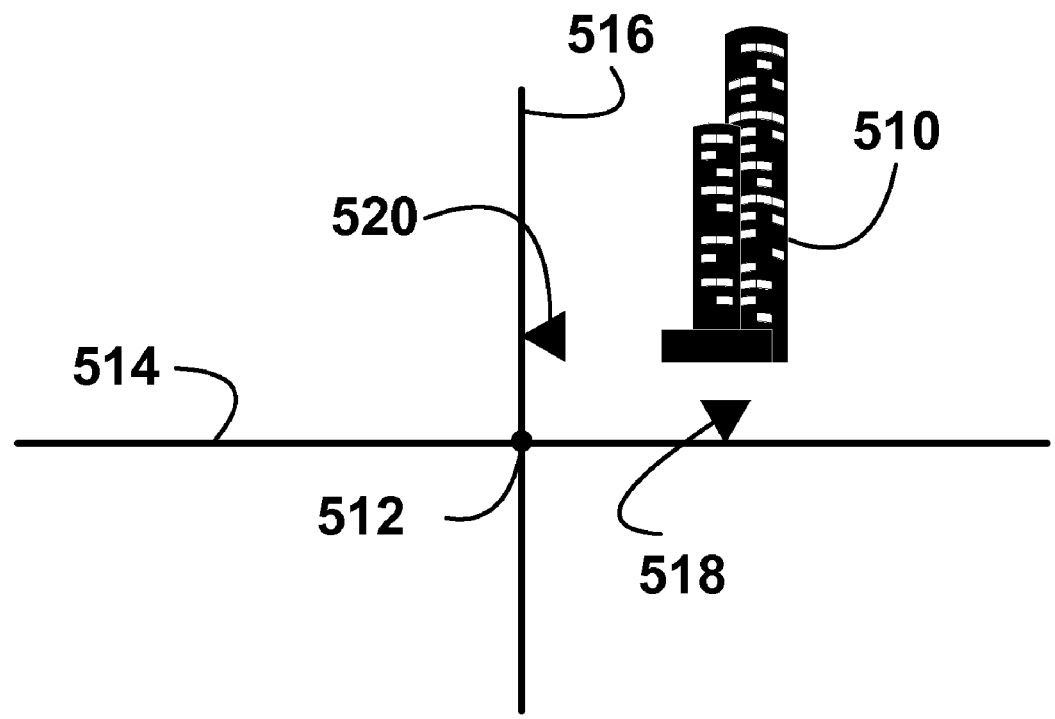

FIGS. 5a and 5b illustrate examples of features visible from a road segment and guidance feature point objects. The feature may be a point of interest, such as a building, or a cartographic feature, such as a lake. FIG. 5a illustrates a cartographic feature of a lake 500 visible from the road segment 502. FIG. 5b illustrates points of interest of a skyscraper 510 proximate an intersection 512 and visible from the road segments 514 and 516. The geographic database developer creates a guidance feature point object for the identified visible feature. The guidance feature point object is created at a location where the feature is most visibly prominent or most visibly identifiable or recognizable for the purpose of providing guidance advice referencing the visible feature. The location (latitude, longitude, and altitude) as well as on which side of the road segment that the visible feature is located is provided. In one embodiment, because the guidance feature point object is located at the road segment from which the feature is most visibly prominent, the guidance feature point object is not located at an access point, drive way, or entrance point of the feature and the guidance feature point object is not located at an address point location of the feature.

Referring to FIG. 5a, a guidance feature point object 504 is located on the road segment 502 at a location where the lake 500 is most visible from the road segment 502. As shown in FIG. 5a, trees 506 obstruct the view of the lake 500 at several points along the road segment 502; therefore, the guidance feature point object 504 is located away from the trees 506 to provide a clear view to the lake 500 from the road segment 502. When defining the guidance feature point object, the geographic database developer determines whether the guidance feature point object is useful to provide passing guidance or junction guidance. Passing guidance supports route guidance when passing a feature; junction guidance supports route guidance when driving (or turning) over a junction and/or intersection. Referring to FIG. 5a, the guidance feature point object 504 may be used to provide passing guidance because it provides a clear view of the lake 500 when passing by the lake 500 on the road segment 502. For the guidance feature point object that is useful for passing guidance, the road segment is associated with the guidance feature point object located at or on the road segment. For the guidance feature point object 504 shown in FIG. 5a that is useful for passing guidance, the road segment 502 is associated with the guidance feature point object 504 and thus associated with the cartographic feature of the lake 500.

Referring to FIG. 5*b*, the skyscraper 510 is proximate to the intersection 512 and visible from road segments 514 and 516. The guidance feature point objects 518 and 520 are located at the road segments 514 and 516 respectively at locations where the skyscraper 510 is most visible without or with limited obstruction from the road segments. The guidance feature point objects 518 and 520 may be used to provide junction guidance because they are proximate and viewable when traveling through or turning at the intersection 512. For the guidance feature point object useful for junction guidance, the guidance feature point object is associated with road segments that have an unobstructed or limited view of the feature with the created guidance feature point object. When determining which road segments to associate with the guidance feature point object, the geographic researcher ensures that it is possible to drive from that road segment (to be associated) onto the road segment at which the guidance feature point object is located. Referring to FIG. 5*b*, the skyscraper 510 is visible from road segments 514 and 516. Road segment 514 is associated with guidance feature point object 518, and road segment 516 is associated with guidance feature point object 520.

The guidance feature point objects are assigned a preferred name for the associated feature. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink building, dome-shaped building, glass building, brick building, gothic architecture building, windowless building, tall building, neon sign of a bird attached to building, fountain in front of building, sculpture in front of building, and so on. Furthermore, the preferred name may include various adjectives to describe the feature, such as grand old courthouse. For the lake 500 of FIG. 5*a*, the preferred name may be "big green lake". In one embodiment, the preferred name may be a locally know name or nickname for the feature, such as "Max Brothers Petrol Shop".

In addition to the preferred name for the feature, the feature has a base name. For a point of interest, the base name is a facility type description or point of interest category, such as office building for the skyscraper 510. For cartographic features, the base name is a cartographic feature type, such as lake for the lake 500. In a further embodiment, the feature includes a brand name or point of interest chain name, such as the brand name of a gas station. In another embodiment, different preferred names may be collected for different end users. For example, one preferred name may be collected for female end users and another preferred name for male end users; one preferred name may be collected for local end users and another preferred name for tourists or end users that do not reside is the geographic region.

The guidance feature point objects, association data and preferred name information described above is included in the geographic database 116 that represents some of the physical geographic features in the geographic region 202. In the exemplary embodiment of FIG. 3, the geographic database 116 that represents the geographic region 202 contains at least one guidance feature point database record 312 for each guidance feature point object in the geographic region 202.

Figure 6:
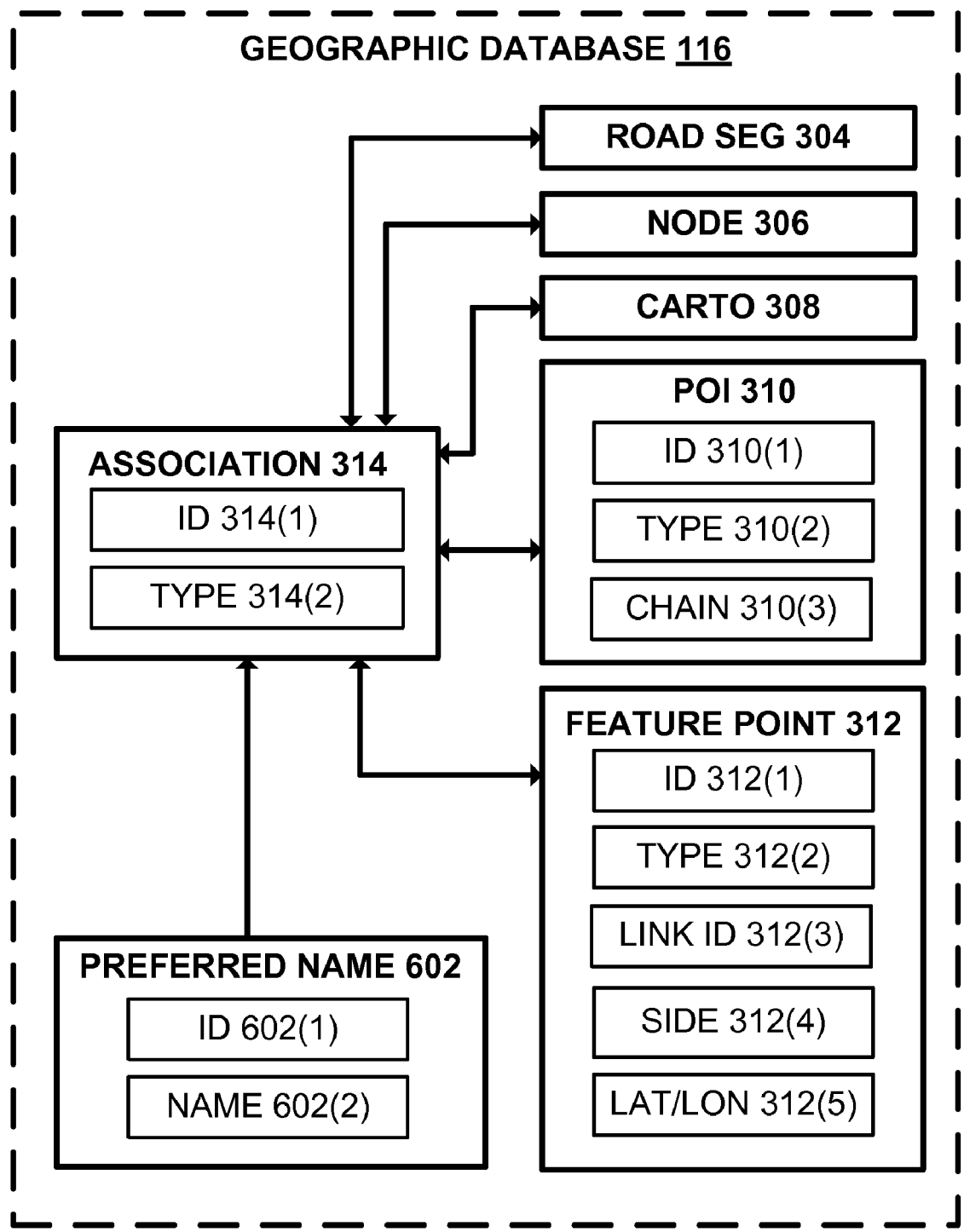
FIG. 6 is a block diagram of components of data records contained in the geographic database.

FIG. 6 shows some of the components of a guidance feature point database record 312. The guidance feature point database record 312 includes a guidance feature point ID 312(1) by which the data record can be identified in the geographic database 116. Each guidance feature point database record 312 has associated with it information (such as "attributes", "fields", etc.) that describes features of the guidance feature point object. The guidance feature point database record 312 may include data 312(2) that indicate a type of guidance feature point object, such as a type used for natural guidance that provides contextual environmental information.

The guidance feature point data record 312 includes data 312(3) that indicate the road segment ID on or at which the guidance feature point object is located. The guidance feature point object data record 312 includes data indicating a side 312(4) of the road segment that the guidance feature point object is located. The data indicating a side 312(4) provides that the feature is to the left or right side relative to a reference node of the road segment. Additionally, side data 312(4) may indicate neither side for when the feature is equally visible on both sides of the road segment. The guidance feature point data record 312 further includes location data 312(5) indicating the longitude and latitude (and altitude) of the guidance feature point object.

The association database records 314 provide a feature association model that defines an association or relationship between two or more database records selected from road segment database records 304, node database records 306, cartographic feature database records 308, point of interest database records 310 and guidance feature point object database records 312. The association members for the context of natural guidance include a road segment associated with a guidance feature point object, a point of interest associated with a road segment and a guidance feature point object, a cartographic feature associated with a road segment and a guidance feature point object, and a node associated with a road segment and a guidance feature point object.

Each association database record 314 includes an ID 314(1) by which the data record can be identified in the geographic database 116. The association database record 314 includes data 314(2) that indicate a type of association, either for passing guidance or for junction guidance. The feature association for passing guidance associates a guidance feature point object and a road segment to support route guidance when driving on the road segment and passing the visible feature corresponding to the guidance feature object point. The feature association for junction guidance associates a guidance feature point object and a road segment to support route guidance when driving or turning over a junction or intersection. In the context of one maneuver over a junction or intersection, the feature associations are defined for the road segment that is connected to the junction or intersection prior to the specific maneuver over the junction or intersection.

Although not shown in FIG. 6, the association data 314 may further include data that links the association data record 314 to the road segment database record 304 by identifying the respective association ID 314(1) and road segment ID 304(1), links the association data record 314 to the node data record 306 by identifying the respective association ID 314 (1) and node ID 306(1), links the association data record 314 to the cartographic feature database record 308 by identifying the respective association ID 314(1) and an ID of cartographic feature, links the association data record 314 to the point of interest database record 310 by identifying the respective association ID 314(1) and ID of the point of interest, and links the association data record 314 to the guidance feature point data record 312 by identifying the respective association ID 314(1) and guidance feature point object ID 312(1).

As shown in FIG. 6, the geographic database 116 also includes preferred name data records 602. The preferred name data 602 includes an ID 602 (1) by which the preferred name data record 602 can be identified in the geographic database 116. The preferred name database record 602 includes data 602(2) that indicate a preferred name when explicating the associated feature during guidance. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink building, red building, dome-shaped building, short-fat building, glass building, brick building, gothic architecture building, windowless building, tall building, neon sign of a bird attached to building, fountain in front of building, sculpture in front of building, and so on. In one embodiment, the preferred name may be a locally know name or nickname for the feature, such as "Max Brothers Petrol Shop." In one embodiment, the preferred name is provided as identified parts of speech including noun, adjective, preposition, article and so on. For example, the preferred name of "big green lake" is provided in the data record as noun of "lake" and adjectives or descriptors of "big" and "green". In one embodiment, more than one preferred name may be included in data 602(2), such as different preferred names for different end users (male, female, tourist and local resident).

III. Route Calculation

As discussed above in conjunction with FIG. 1, the navigation system 100 includes navigation application software programs 110 that provide the various navigation features and functions. In one embodiment, the navigation functions and features include route calculation 124. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as route preferences. Given at least the identification of the starting location and the destination location, the route calculation function 124 determines one or more solution routes between the starting location and the destination location. A solution route is formed of a series of connected road segment over which the end user can travel from the starting location to the destination location.

When the route calculation function 124 calculates a route, it accesses the geographic database 116 and obtains the road segment data records 304 and/or other data. The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The route calculation function 124 provides an output. In one embodiment, the output of the route calculation function 124 is in the form of an ordered list identifying a plurality of road segments, such as the road segment IDs 304(1) (i.e., seg1, seg2, seg3, . . . , seg(E), seg(F)) from the geographic database 116. The plurality of road segment IDs 304(1) represents the road segments that form the continuous navigable route between the origin and the destination that had been calculated by the route calculation function 124. (The route calculation function 124 may calculate more than one solution route.) Although the above description for route calculation depicts a route as a series of road segments, the route may also be for a pedestrian including sidewalks and crosswalks. Furthermore, the route may be for any mode of transportation.

IV. Route Guidance

The route guidance function 126 uses the output of the route calculation function 124 to generate detailed directions or guidance messages for following the calculated route. In an exemplary embodiment, the route guidance function 126 evaluates each of the road segments that comprise the calculated route and prepares passing guidance messages and junction guidance messages. Passing guidance messages provide directions and environmental cues when driving the road segment and passing a visible feature. Junction guidance messages provide maneuver directions and environmental cues when driving or turning over a junction or intersection. The guidance messages may be prepared before the route is traveled or during travel of the route. The passing guidance message and junction guidance message may be provided for each component road segment of the route or only for a subset thereof. The guidance messages are generally required at decision points along the route that require a maneuver.

The guidance function 126 generates a guidance message using the preferred name of the feature associated with the guidance feature object point. For the example shown in FIG. 5a, the guidance message references the lake 500 (and its guidance feature point object 502). In the exemplary embodiment, the guidance function 126 obtains the preferred name 602(2) from the geographic database 116. For example, the lake 500 has a preferred name of "big green lake" that identifies its relative size and color. In other embodiments, the preferred name may be the words that describe visible characteristics or visually distinguishing element of the feature, such as the color, shape, age, building material, size, architectural style, decorative feature, luster, motion and/or any visible attribute that distinguishes the feature from other features in the surrounding area. For example, the special name may be pink building, red building, dome-shaped building, glass building, brick building, gothic architecture building, windowless building, tall building, neon sign of a bird attached to building, fountain in front of building, sculpture in front of building, and so on. In another embodiment, the preferred name may be a locally know name or nickname for the feature, such as "south-side lake." In one embodiment, the guidance function 126 chooses from more than one available preferred name based on characteristics of the end user, such as a preferred name for a female end user.

For the road segment 502 shown in FIG. 5a, the guidance message is "follow the road passing the big green lake." This guidance message is provided via the user interface 114 of the navigation system 100 when passing the location of the associated guidance feature point object 504 for the lake 500. The guidance message may be provided on the display associated with the user interface 114 or as an audio message from a speaker associated with the user interface 114.

V. Text-To-Speech Conversion for Non-Native Language

To generate the audio comprising the guidance message, the navigation system 100 implements the text-to-speech (TTS) application 132 on the processor 104. The TTS function 132 uses the output of the route guidance function 126 to convert the text of the detailed directions or the guidance messages for following the calculated route into speech. In an exemplary embodiment, the TTS function 132 converts the text of the guidance message into phonemes; a phoneme is a unit of distinctive sound in a language that can distinguish words (changing one phoneme in a word produces a different word).

In general, an algorithmic conversion of text to phonemes is possible when a given language's orthography has been matched to a native set of phonetics. In other words, English spelling conventions are matched to discrete English phonemes, Spanish spelling conventions to Spanish phonemes, and overlap between languages differs to a greater or lesser degree. Unfortunately, the text-to-speech algorithms do not provide comprehensible output when confronted with unknown non-native orthographies or phoneme set. That is, the text-to-speech conversion is typically not available to users outside of their native language. For example, text-to-speech conversion typically fails when attempting to convert a sentence containing both English and Spanish phrases into Spanish.

In one embodiment, the navigation system 100 provides enhanced guidance (natural guidance) that provides details regarding the user's environment and context to more natural, environmental and intuitive triggers. As discussed above, to provide the enhanced guidance messages, the guidance messages include the preferred name of the visible feature. The geographic database 116 data records 602 representing the preferred names for guidance feature point objects used to generate the guidance messages. In one embodiment, the geographic database 116 provides the preferred names in a single language, such as English. In alternative embodiments, the preferred names are provided in multiple languages. To provide voice guidance in a target language that is different from the language of the preferred names from the geographic database 116, the TTS function 132 performs a method shown in the flow chart of FIG. 7 for creating non-native phonetics for a preferred name. For example, the user of the navigation system 100 desired that the guidance messages be spoken in German, but the preferred names from the geographic database 116 are in English. Accordingly, the TTS function 132 performs the steps shown in FIG. 7 to convert the preferred names in English into preferred names in German.

Figure 7:
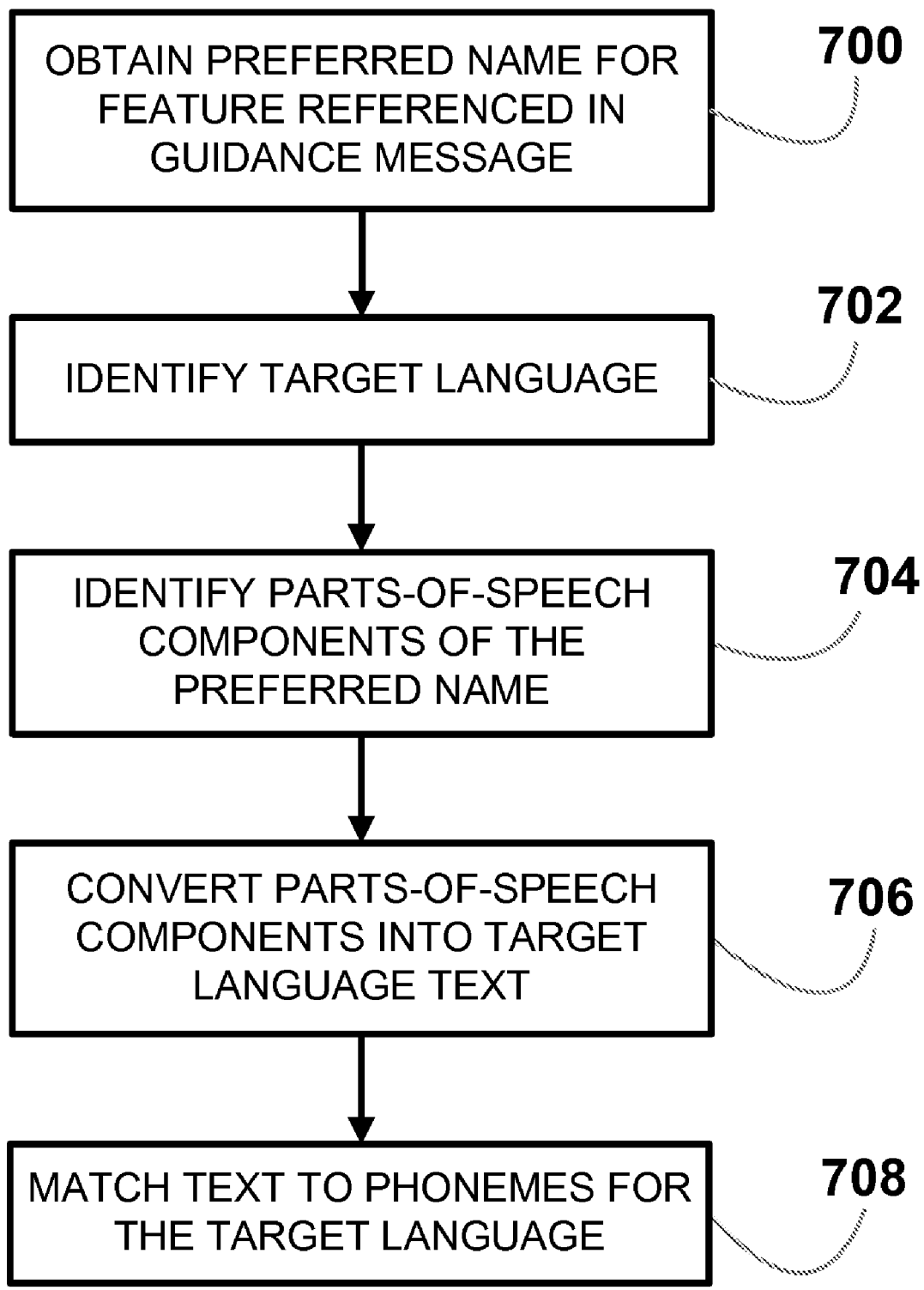
FIG. 7 is a flow chart for providing Text-To-Speech for preferred names in a non-native language.

Referring to FIG. 7, the TTS function 132 obtains the preferred name of the feature associated with the guidance feature object point that is used in the guidance message at step 700. The preferred name 602(2) is obtained from the geographic database in the native language, such as English. In one embodiment, the preferred name data record 602 includes data indicating the native language of the preferred name. At step 702, the TTS function 132 identifies the target language for voice guidance messages, for example German. If the target language and the native language of the preferred name are identical, the method skips to step 708. If the target language is different from the native language, the TTS function 132 continues to step 704.

At step 704, the TTS function 132 identifies the parts-of-speech components of the preferred name, including noun, adjectives, prepositions, articles and so on at step 704. In one embodiment, the TTS function 132 parses the preferred name in its native language into the parts-of-speech components using the Brill Tagger algorithm for tagging parts-of-speech, using the CYK (Cocke-Younger-Kasami) algorithm or some other method known to one skilled in the art. In one embodiment, the parsing or tagging algorithm is seeded based on a core set of known vocabulary items using a priori knowledge of the preferred name dataset, such as a set of descriptors established by convention, or through stochastic analysis of common elements that may be refined manually. The output of the algorithm identifies the parts-of-speech components of the preferred name. For the preferred name of "black skyscraper", the Brill Tagger algorithm identifies parts-of-speech components of noun of "skyscraper" and adjective "black"; for the preferred name of "big green lake", the output of the parsing algorithm is noun of "lake" and adjectives of "big" and "green"; for the preferred name of "pink building with a fountain", the output of the parsing algorithm is noun of "building", adjective of "pink" preposition of "with", article of "a" and noun of "fountain".

In another embodiment, the TTS function 132 identifies the parts-of-speech components of the preferred name by obtaining the parts-of-speech components of the preferred name directly from the geographic database 116. In this embodiment, the preferred name is provided as identified parts of speech including noun, adjective, preposition, article and so on in the preferred name data record 602. For example, the preferred name of "big green lake" is provided in the data record as noun of "lake" and adjectives or descriptors of "big" and "green". For the preferred name of "black skyscraper", the preferred name record 602 includes data that identifies the noun of "skyscraper" and adjective "black".

At step 706, the TTS function 132 converts the parts-of-speech components of the preferred name in the native language into target language text. The TTS function 132 applies transformational and grammar rules of the target language to create the preferred name in the target language text. The noun and adjective components of the preferred name of the native language are translated into the target language. For example, for the noun of "skyscraper" in English is translated into "wolkenkratzer" in German, and the adjective of "black" in English is translated into "schwarze" in German. The translated parts-of-speech components are arranged into text following the grammar rules of target language; for example, the preferred name in the target language text is "schwarze Wolkenkratzer".

At step 708, the TTS function 132 matches the target language text of the preferred name to phonemes for the target language. In one embodiment, the phonemes for the target language are stored in a database associated with the navigation system 100. For example, each word in the target language text is matched to phonemes for German stored on a database. In one embodiment, the TTS function 132 provides a SAMPA (Speech Assessment Methods Phonetic Alphabet) representation of the preferred name in the target language providing a computer-readable phonetic script in the target language which may be used to provide the guidance message with the preferred name in the target language through the speaker of the user interface.

The TTS function 132 allows the navigation system 100 to provide enhanced guidance messages using environmental cues and features readily visible in multiple languages without having to include different language versions of the preferred name in the geographic database 116. This feature is useful to tourists that do not understand the native language. By providing enhanced guidance messages in the user's language with reference to features visible in the user's environment, the user will be able to better follow the route with less confusion. Although the above TTS function 132 typically provides the preferred name in the target language as speech, in another embodiment, the preferred name in the target language may be provided as text on the display of the navigation system.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer implemented method of operating a navigation system to provide a guidance message for traveling a route comprising road segment, the method comprising:
    obtaining, by a processor, data from a geographic database associated with the navigation system identifying a feature visible from the road segment;
    obtaining, by the processor, preferred name data from the geographic database representing a preferred name of said feature visible from the road segment, wherein the preferred name provides a visual description of the feature in a first language;
    identifying, by the processor, a part-of-speech for at least two components of the preferred name;
    converting, by the processor, the at least two components of the preferred name into a text of a second language according to the part-of-speech for the at least two components and a grammar rule of the second language to provide the preferred name in the second language, wherein the second language is different from the first language; and
    providing the guidance message including the text of the second language.

2. The method of claim 1 further comprising:
    matching the text of the second language to phonemes for the second language; and
    providing the guidance message as speech.

3. The method of claim 1 wherein a parsing algorithm is used to identify the parts-of-speech components of the preferred name.

4. The method of claim 1 wherein the parts-of-speech components of the preferred name are indicated by data from the geographic database.

5. The method of claim 1 wherein the parts-of-speech components include a noun and an adjective.

6. The method of claim 1 wherein the preferred name includes a color of the feature.

7. The method of claim 1 wherein the preferred name includes a building material of the feature.

8. The method of claim 1 wherein the preferred name includes a shape of the feature.

9. The method of claim 1 wherein the guidance message is provided as the navigation system passes the feature.

10. The method of claim 1 wherein the guidance message is provided prior to an intersection.

11. A navigation system comprising:
    a geographic database configured to store a preferred name for a feature, and
    a processor configured to obtain data from the geographic database identifying the preferred name for the feature, wherein the preferred name is in a native language, the processor configured to identify parts-of-speech of a plurality of components of the preferred name, translate the parts-of-speech of the preferred language into a target language and create a target language text representing the preferred name in the target language according to the parts-of-speech of the plurality of components of the preferred name and at least one grammatical rule of the target language.

12. The navigation system of claim 11 wherein the processor is configured to match the target language text to phonemes for the target language.

13. The navigation system of claim 11 wherein a parsing algorithm is used to identify the parts-of-speech of the plurality of components of the preferred name.

14. The navigation system of claim 11 wherein the parts-of-speech of the plurality of components of the preferred name are indicated by data from the geographic database.

15. The navigation system of claim 11 wherein the parts-of-speech include a noun and an adjective.

16. The navigation system of claim 11 wherein the preferred name includes at least one visible descriptor selected from a group consisting of a color of the feature, a building material of the feature, a shape of the feature, an architectural style of the feature, and a decorative element of the feature.

17. A computer implemented method of operating a navigation system to provide a guidance message, the method comprising:
    obtaining, by a processor, data from a geographic database associated with the navigation system to identify a preferred name of a visible feature, wherein the preferred name is in a first language;
    identifying, by the processor, parts-of-speech components of the preferred name; and
    translating, by the processor, the parts-of-speech components of the preferred name into a target language and arranging the translated components into a target language text to provide the preferred name of the visible feature in the target language, wherein the target language is different from the first language.

18. The method of claim 17 wherein the preferred name includes at least one visible descriptor selected from a group consisting of a color of the visible feature, a building material of the visible feature, a shape of the visible feature, an architectural style of the visible feature, and a decorative element of the visible feature.

19. The method of claim 17 wherein the wherein the parts-of-speech components of the preferred name are indicated by data from the geographic database.

20. The method of claim 17 wherein the preferred name includes at least an adjective and a noun for parts-of-speech components.

* * * * *